(12) United States Patent
Hamilton (10) Patent No.: US 7,860,704 B2
(45) Date of Patent: Dec. 28, 2010

(54) LEXICON-BASED CONTENT CORRELATION AND NAVIGATION

(75) Inventor: Keith S. Hamilton, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1049 days.

(21) Appl. No.: 11/638,217

(22) Filed: Dec. 13, 2006

(65) Prior Publication Data

US 2008/0147597 A1     Jun. 19, 2008

(51) Int. Cl.
    *G06F 17/20*     (2006.01)
(52) U.S. Cl. ............... 704/1; 704/4; 704/9; 704/10
(58) Field of Classification Search ............. 704/1, 704/9, 10, 4, 257
    See application file for complete search history.

(56) References Cited

U.S. PATENT DOCUMENTS

| | | | |
|---|---|---|---|
| 5,963,965 A | 10/1999 | Voge | |
| 6,041,331 A | 3/2000 | Weiner et al. | |
| 6,263,335 B1 | 7/2001 | Pail et al. | |
| 6,415,319 B1 | 7/2002 | Ambroziak | |
| 7,027,975 B1* | 4/2006 | Pazandak et al. ............... | 704/9 |
| 2002/0028299 A1* | 3/2002 | Yamane et al. ............... | 427/421 |
| 2002/0038299 A1 | 3/2002 | Zernik et al. | |
| 2003/0020749 A1 | 1/2003 | Abu-Hakima et al. | |
| 2005/0038866 A1* | 2/2005 | Noguchi et al. ............. | 709/217 |
| 2005/0050163 A1 | 3/2005 | Cole et al. | |
| 2006/0059138 A1 | 3/2006 | Milic-Frayling et al. | |
| 2006/0116987 A1* | 6/2006 | Bernard ......................... | 707/3 |
| 2006/0218122 A1 | 9/2006 | Poston et al. | |

OTHER PUBLICATIONS

"LookAhead Demos: Changing the Face of Search", http://lookahead.surfwax.com/demo99.html.
Ghitalla, et al., "Extracting and Exploring Web Aggregates with Experimental Visualisation Tools", http://www.utc:fr/rtgi/documents/W104_UTC2.pdf.
Menczer Filippo, "Combining Link and Content Analysis to Estimate Semantic Similarity", Date: 2004, pp. 452-453, ACM Press, New York, USA, http://portal.acm.org/citation.cfm?id=1013367.1013521.

* cited by examiner

*Primary Examiner*—Qi Han
(74) *Attorney, Agent, or Firm*—L. Alan Collins; Collins & Collins Incorporated (57) ABSTRACT

Various technologies and techniques are disclosed that use lexicons in content searching and browsing. Lexicons for a particular subject matter are identified. Groups of content are correlated together based upon the lexicons for the particular subject matter. Upon request, a particular portion of content, such as a web page, is displayed. The lexicon(s) for the particular content are retrieved and the key words of the lexicon(s) contained in the particular content are displayed in some manner. For example, the key words of the lexicon(s) that are present in the particular content can be visually indicated. As another example, the correlations to other content can be displayed upon selecting a particular key word of a lexicon that is present in the particular content.

15 Claims, 14 Drawing Sheets

LEXICON-BASED CONTENT CORRELATION AND NAVIGATION

BACKGROUND

The Internet makes it easier than ever before to find information about a given topic. Search engines index content from around the world, and allow users to find electronic information about practically any subject matter known to man in various languages. Users often perform searches for particular topics of interest by entering key words into a search engine. Key word searching is problematic for at least two reasons. First, the user does not know what key words the relevant content may use. Second, the user does not know what key words the search engine is using for its content analysis. Because of these problems, the user often must spend a lot of time on multiple search attempts to refine the search criteria. As part of this refinement process, the user often has to scroll through a lot of non-relevant content just to find the relevant content.

SUMMARY

Various technologies and techniques are disclosed that use lexicons in content searching and browsing. A lexicon for a particular subject matter is identified. Groups of content are correlated together based upon the lexicon for the particular subject matter. Upon request, a particular portion of content, such as a web page, is displayed. The lexicon for the particular content is retrieved and the key words contained in the lexicon of the particular subject matter are displayed in some manner. For example, the key words of the lexicon that are present in the particular content can be visually indicated, such as with a highlight. As another example, the correlations to other content can be displayed upon selecting a particular key word of a lexicon that is present in the particular content. These correlations allow a user to review additional content that is related to the particular content already being viewed.

In one implementation, lexicons are identified in a set of content and the key words contained in the content are stored by a search engine when the content is indexed. Correlations to other content that share common key words of a lexicon are also created. These key words and correlations are then used by the search engine to help respond to a user's search request.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as a content searching application, but the system also serves other purposes in addition to these. In one implementation, one or more of the techniques described herein can be implemented as features within a search engine, or from any other type of program or service that allows a user to search for content within a large volume of indexed content. In another implementation, one or more of the techniques described herein are implemented as features with other applications that deal with key word searches.

In one implementation, the system identifies the lexicons that are present on a given one or more portions of content, such as one or more web pages, PDF files, Word documents, and so on. The term "lexicon" as used herein means the important terms used in a given subject matter or profession. Once these lexicons (collections of key words) are identified, they are used to correlate the particular portion of content with other portions of content. For example, using the lexicon, a particular web page can be correlated with various other web pages that contain related content (e.g. based on some of the same key words). A given web page (or other document) may contain content from just one subject matter, or it may contain content from more than one subject matter (such as a blog, portal, etc. that have different topics on the same page) Thus, there can be one or more lexicons related to the content on a given web page. Once the lexicon(s) are identified, a particular portion of content can then be marked-up and displayed appropriately to reflect the lexicon information. For example, the key words of the lexicon(s) present in the content can be visually indicated on the screen when displaying the content (such as a particular web page) so the user can see what terms are important in a given field. These terms may be helpful to the user for performing additional searches, and/or for using other interactive features based upon the lexicon(s). As another example, a user can select a particular term on the screen that is one of the key words of the lexicon to display the correlated content. This correlated content allows the user to access other related content, such as other web pages, that may be of interest to the user.

Many of the examples discussed herein describe the technologies and techniques as they apply to searching for content on web pages. However, it will be appreciated that these technologies and techniques are also applicable to any other type of content that can be searched and/or indexed based on the words it contains, such as PDF files, Word documents, and so on. For example, if a given discussion mentions that key words of a lexicon are displayed visually on a given web page, and/or key words of a lexicon allow the user to access associated web pages through hyperlinks or other means, the same techniques could be used with PDF files, Word documents, and other types of documents.

Figure 1:
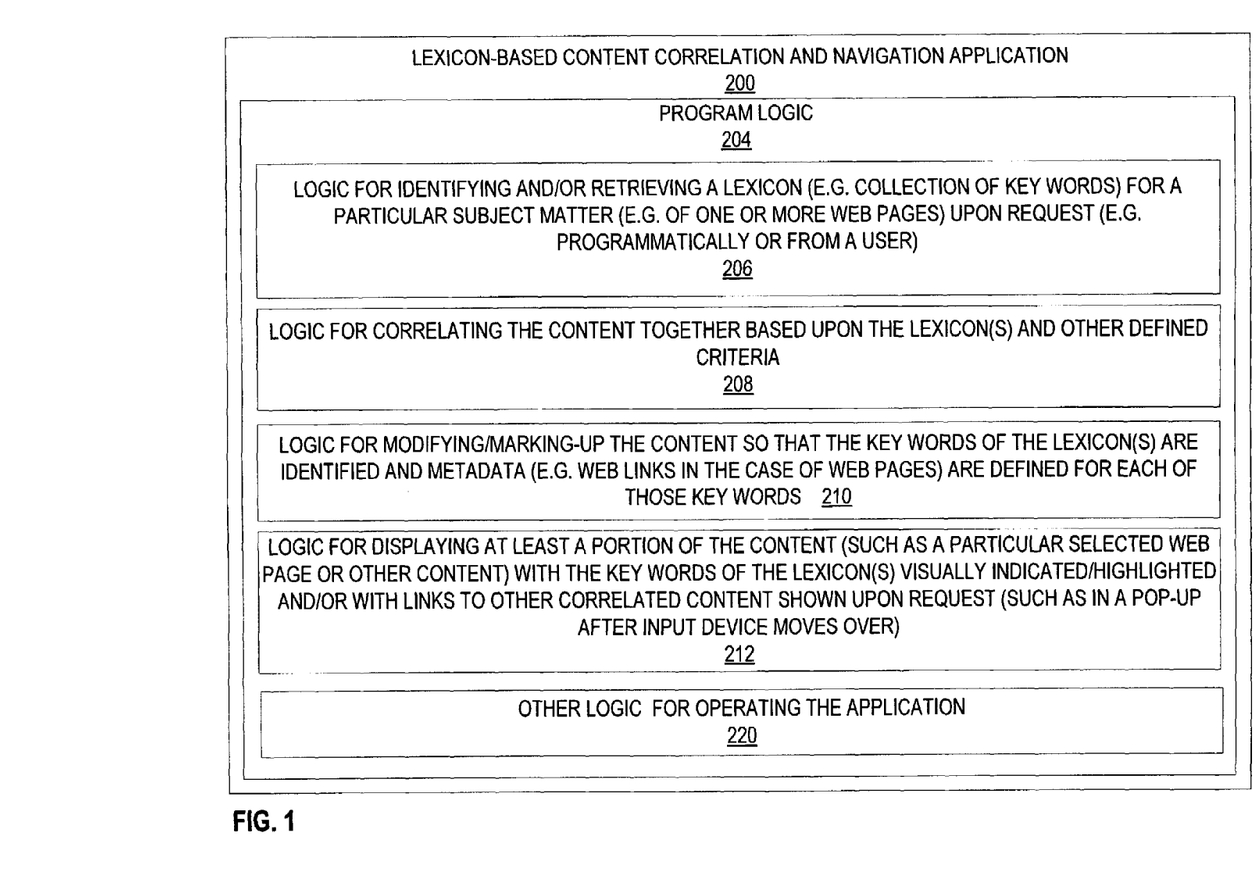
FIG. 1 is a diagrammatic view of a lexicon-based content correlation and navigation application of one implementation operating on the computer system of FIG. 1.

Turning now to FIG. 1, a lexicon-based content correlation and navigation application 200 is illustrated. In one implementation, lexicon-based content correlation and navigation application 200 is one of the application programs that reside on computing device 700 (on FIG. 14). However, it will be understood that lexicon-based content correlation and navigation application 200 can alternatively or additionally be embodied as computer-executable instructions on one or more computers and/or in different variations than shown on FIG. 14. Alternatively or additionally, one or more parts of lexicon-based content correlation and navigation application 200 can be part of system memory 704 (on FIG. 14), on other computers and/or applications 715 (on FIG. 14), or other such variations as would occur to one in the computer software art.

Lexicon-based content correlation and navigation application 200 includes program logic 204, which is responsible for carrying out some or all of the techniques described herein. Program logic 204 includes logic for identifying and/or retrieving a lexicon (e.g. a collection of key words) for a particular subject matter (e.g. those present in one or more web pages) upon request (e.g. programmatically or from a user) 206; logic for correlating the content together based upon the lexicons and other defined criteria 208; logic for modifying/marking-up the content so that the key words of the lexicon(s) are identified and metadata (e.g. web links in the case of web pages) are defined for each of those key words 210; logic for displaying at least a portion of the content (such as a particular selected web page) with the key words of the lexicon(s) visually indicated/highlighted and/or with links to other correlated content shown upon request (such as in a pop-up after input device moves over) 212; and other logic for operating the application 220. In one implementation, program logic 204 is operable to be called programmatically from another program, such as using a single call to a procedure in program logic 204.

Figure 2:
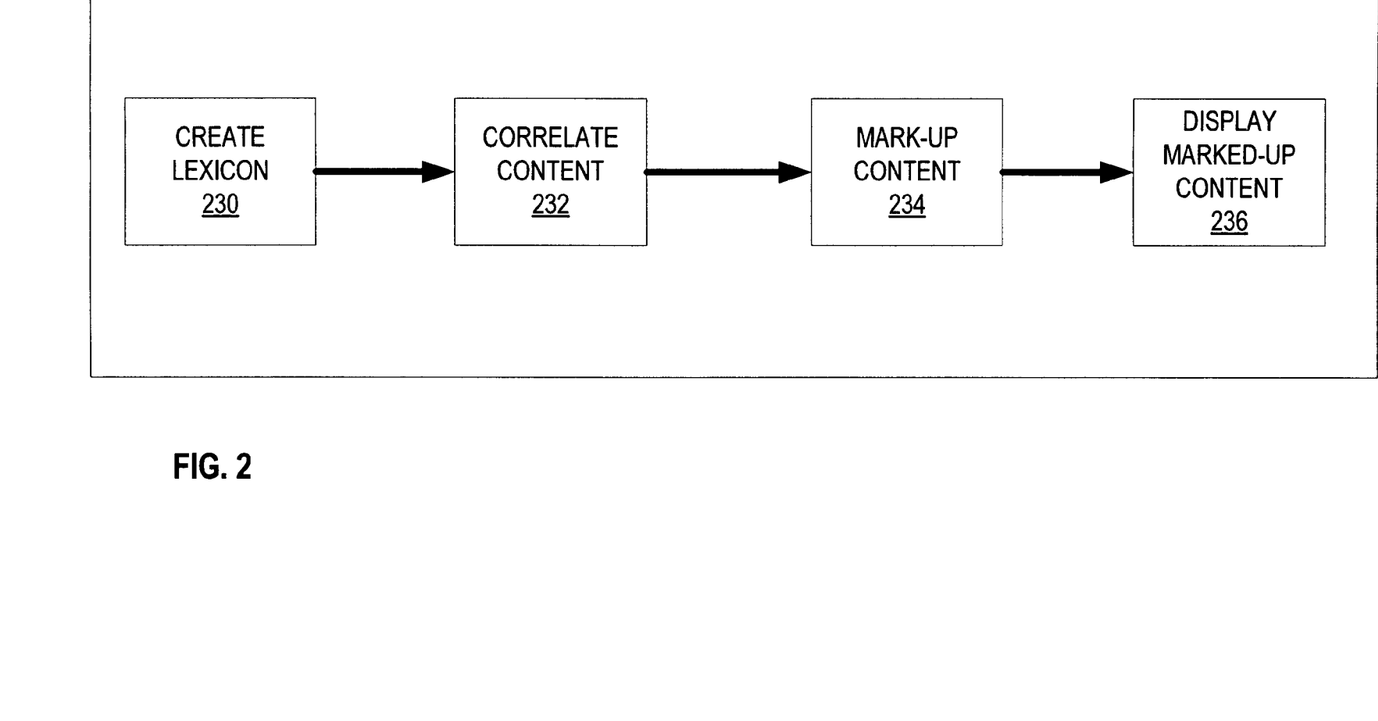
FIG. 2 is a high-level process flow diagram for one implementation of the system of FIG. 1.

Turning now to FIGS. 2-11, the stages for implementing one or more implementations of lexicon-based content correlation and navigation application 200 are described in further detail. FIG. 2 is a high level process flow diagram for lexicon-based content correlation and navigation application 200. In one form, the process of FIG. 2 is at least partially implemented in the operating logic of computing device 700 (of FIG. 14). The procedure begins with creating lexicons (stage 230). The content is then correlated using one or more lexicons (stage 232). Some or all of the content is then modified/marked-up accordingly (stage 234) and displayed (stage 236). These high level stages are described in more detail in FIG. 3.

Figure 3:
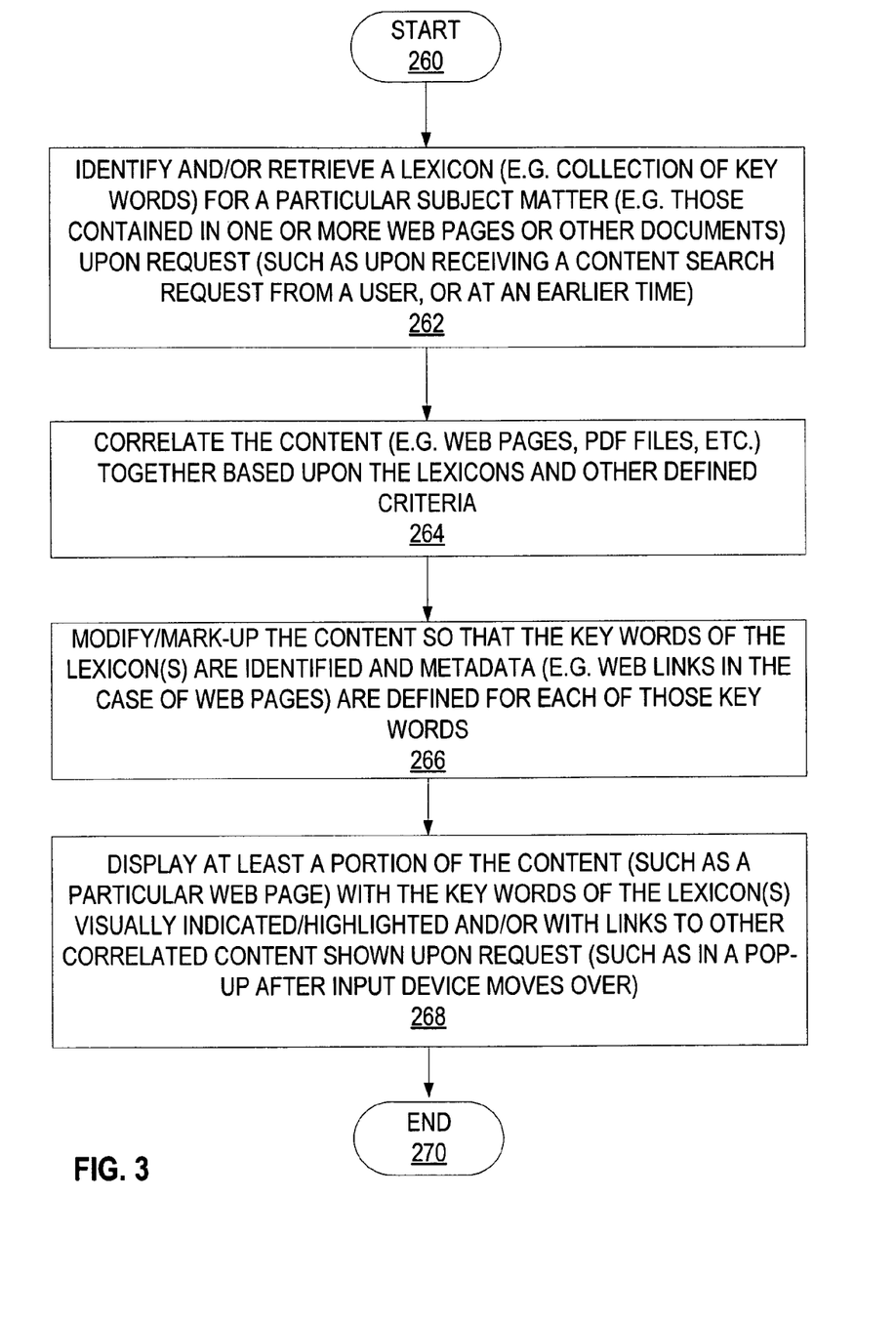
FIG. 3 is a process flow diagram for one implementation of the system of FIG. 1 illustrating the more detailed stages involved in identifying lexicons and correlating content.

Turning now to FIG. 3, one implementation of the more detailed stages involved in identifying lexicons and correlating content is described. In one form, the process of FIG. 3 is at least partially implemented in the operating logic of computing device 700 (of FIG. 14). The procedure begins at start point 260 with identifying and/or retrieving a lexicon (e.g. a collection of key words) for a particular subject matter (e.g. those contained in one or more web pages or other documents) upon request (stage 262). As a few non-limiting examples, the lexicon(s) can be identified and/or retrieved upon receiving a content search request from a user, or at an earlier time (stage 262). The content (e.g. web pages, pdf files, etc.) are correlated together based upon the key words of the lexicon(s) and other defined criteria (stage 264). The content is modified/marked-up so that the key words of the lexicon(s) are identified and metadata (e.g. web links in the case of web pages) are defined for each of those key words (stage 266). At least a portion of the content (such as a particular web page) is displayed with the key words of the lexicon(s) highlighted and/or with links to other correlated content shown upon request (such as in a pop-up after an input device moves over) (stage 268). The process ends at end point 270.

Figure 4:
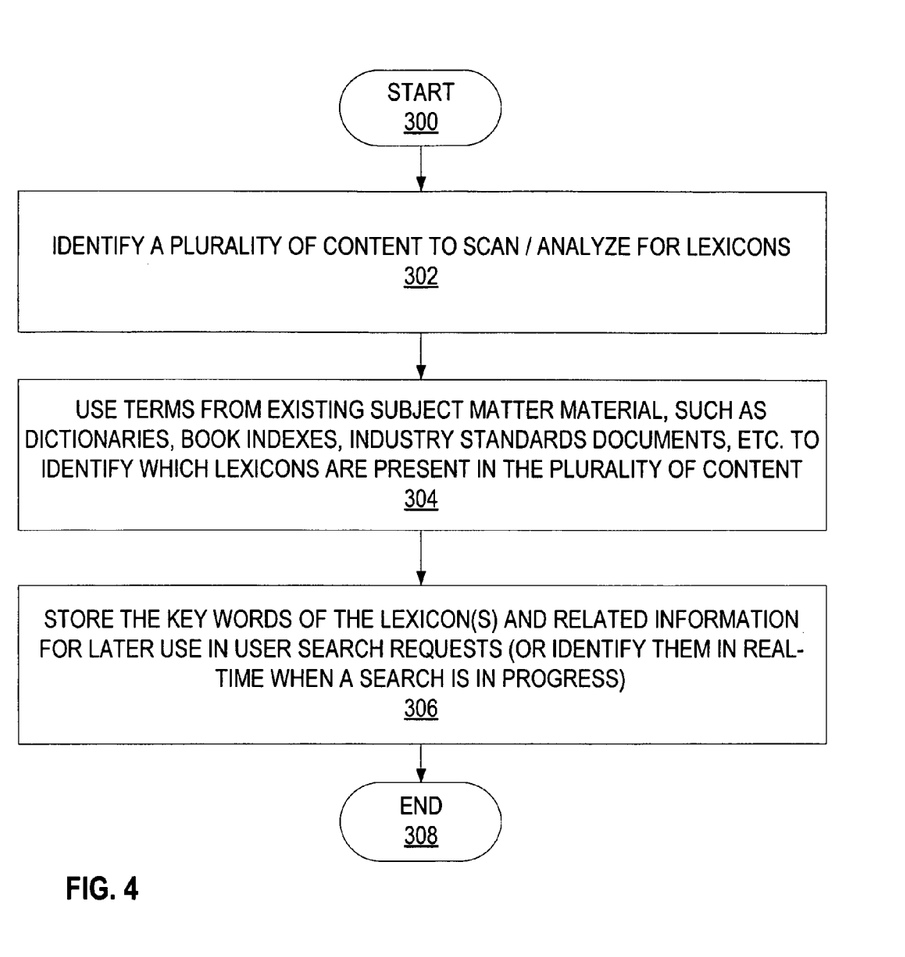
FIG. 4 is a process flow diagram for one implementation of the system of FIG. 1 illustrating the stages involved in identifying lexicons.

FIG. 4 illustrates one implementation of the stages involved in identifying lexicons. In one form, the process of FIG. 4 is at least partially implemented in the operating logic of computing device 700 (of FIG. 14). The procedure begins at start point 300 with identifying a plurality of content to scan/analyze for lexicons (stage 302). The system uses terms from existing subject matter material, such as dictionaries, book indexes, industry standards documents, etc. to identify which lexicons are present in the plurality of content (stage 304). The key words of the lexicon(s) and related information are stored for later use in user search requests (or identified in real-time when a search is in progress) (stage 306). The process ends at end point 308.

Figure 5:
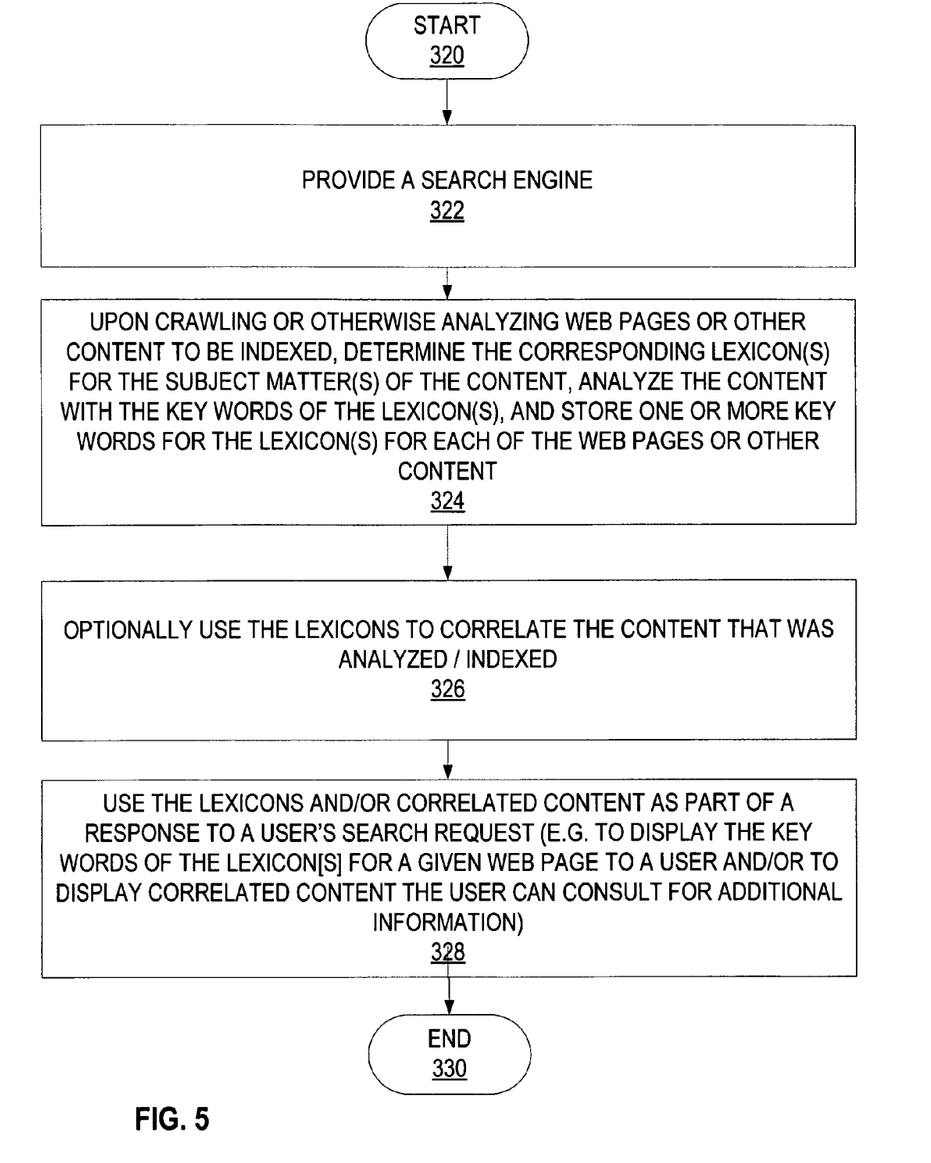
FIG. 5 is a process flow diagram for one implementation of the system of FIG. 1 illustrating the stages involved in using lexicons with search engines.

FIG. 5 illustrates one implementation of the stages involved in using lexicons with search engines. In one form, the process of FIG. 5 is at least partially implemented in the operating logic of computing device 700 (of FIG. 14). The procedure begins at start point 320 with providing a search engine (stage 322). Upon crawling or otherwise analyzing web pages or other content to be indexed, the system determines which lexicon(s) correspond to the content based upon it's subject matter(s), and stores key words from one or more lexicons for each of the web pages or other content where the key words of the content is found in the lexicon(s) (stage 324). The lexicons are optionally used to correlate the content that was analyzed/indexed (stage 326). The lexicons and/or correlated content are used as part of a response to a user's search request (e.g. to display the key words of the lexicon(s) for a given web page to a user and/or to display correlated content the user can consult for additional information) (stage 328). The process ends at end point 330.

Figure 6:
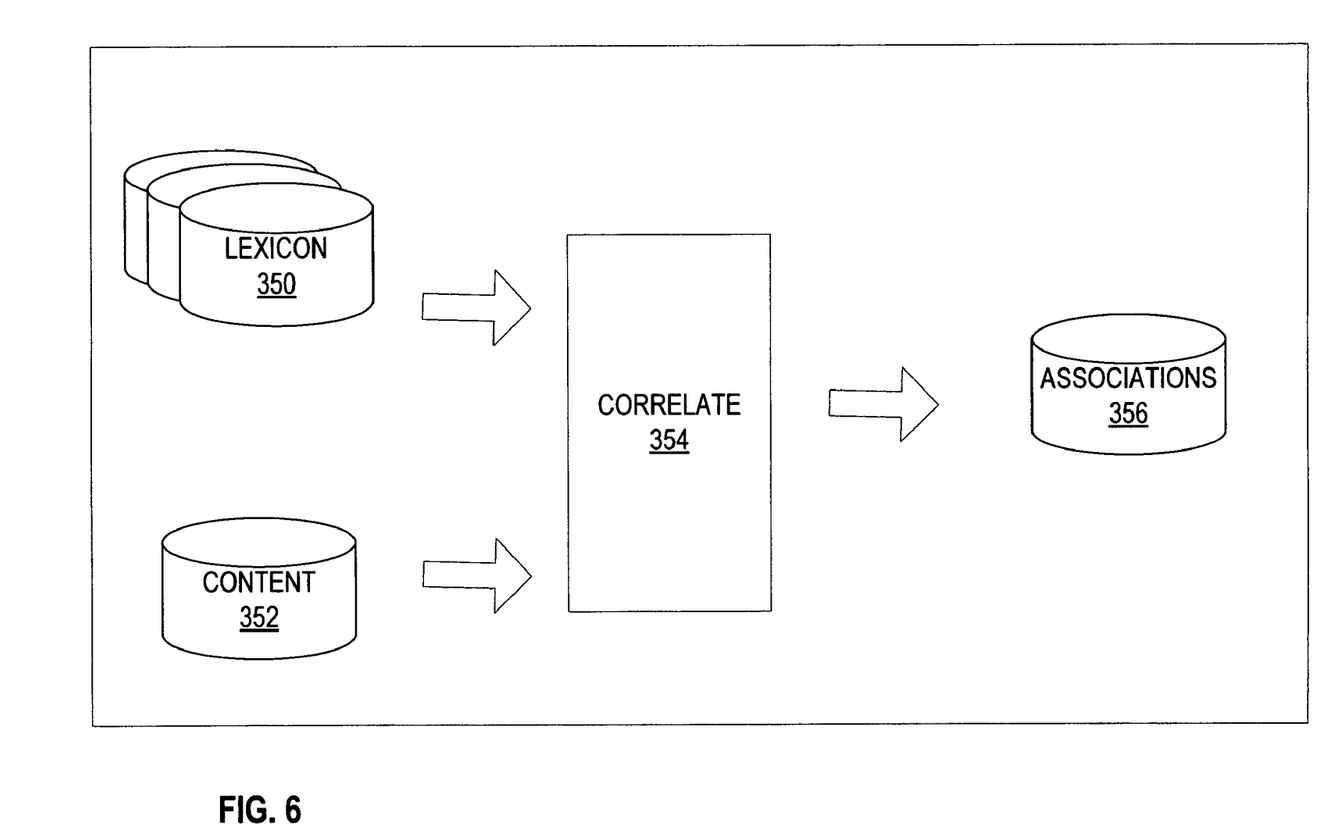
FIG. 6 is a process flow diagram for one implementation of the system of FIG. 1 illustrating the stages involved in correlating content using lexicons.

FIG. 6 illustrates one implementation of the high level stages involved in correlating content using lexicons. In one form, the process of FIG. 6 is at least partially implemented in the operating logic of computing device 700 (of FIG. 14). The procedure begins with lexicons 350 and content 352 being correlated with each other 354 to arrive at one or more associations 356. These stages will be described in further detail in FIG. 7.

Figure 7:
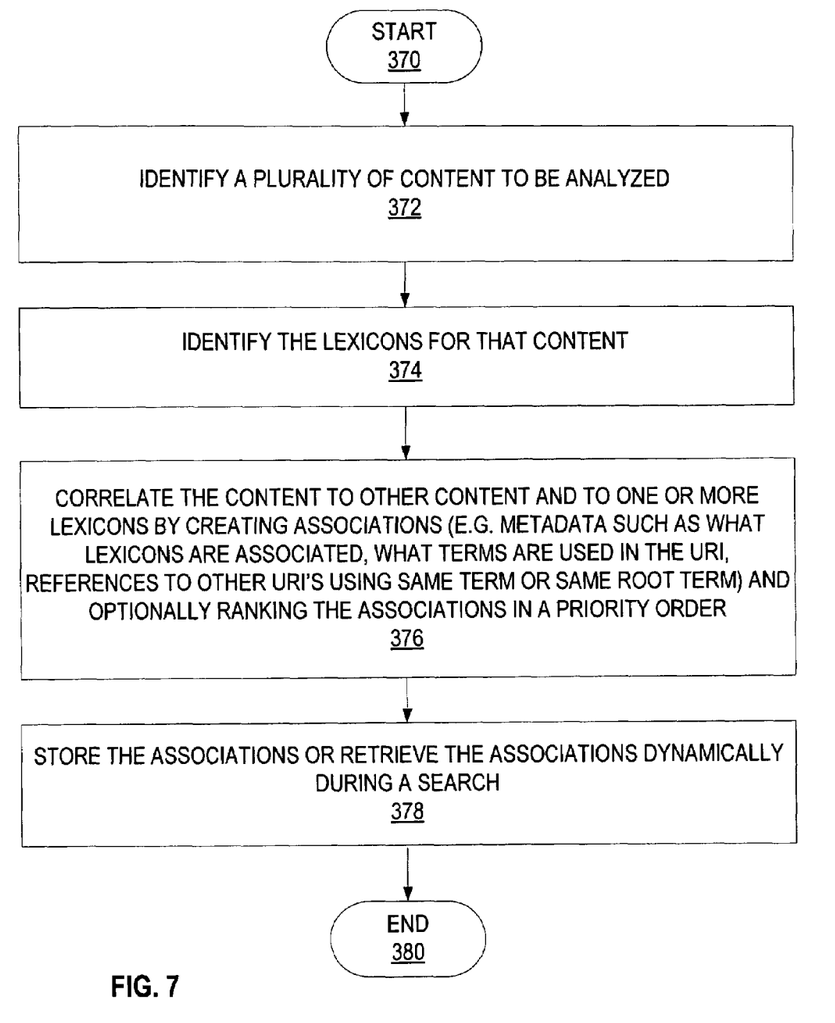
FIG. 7 is a process flow diagram for one implementation of the system of FIG. 1 that illustrates the more detailed stages involved in correlating content using the key words of lexicons.

Turning now to FIG. 7, one implementation of the more detailed stages involved in correlating content using the key words of lexicons is described. In one form, the process of FIG. 7 is at least partially implemented in the operating logic of computing device 700 (of FIG. 14). The procedure begins at start point 370 with identifying a plurality of content to be analyzed (stage 372). The one or more lexicons for that content are identified (stage 374). The content is correlated to other content and to one or more lexicons by creating associations (e.g. metadata such as what lexicons are associated, what terms are used in the URI, references to other URI's using same term or same root term) (stage 376). The associations are optionally ranked in a priority order (stage 376). The associations are stored, or are retrieved dynamically during a search (stage 378). The process ends at end point 380.

Figure 8:
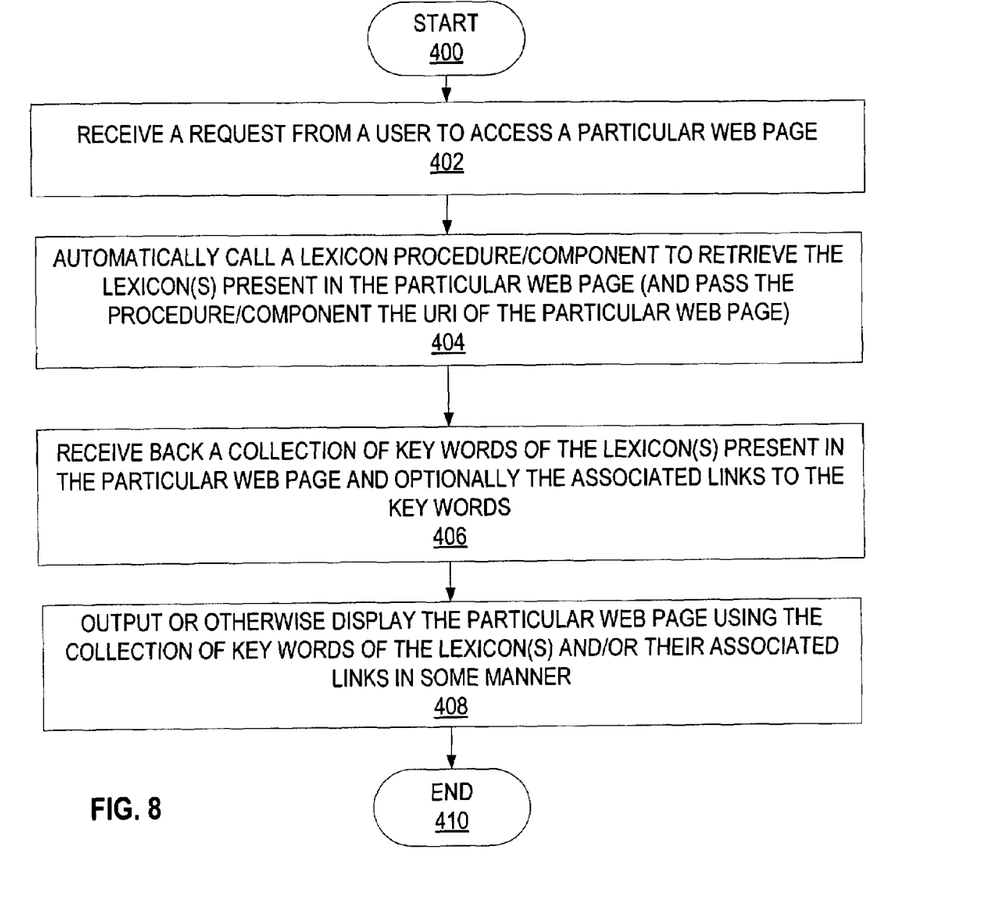
FIG. 8 is a process flow diagram for one implementation of the system of FIG. 1 that illustrates the stages involved in retrieving and using the key words of a lexicon for a particular web page automatically when the page is accessed.

FIG. 8 illustrates one implementation of the stages involved in retrieving and using key words of one or more lexicons for a particular web page automatically when the page is accessed. In one form, the process of FIG. 8 is at least partially implemented in the operating logic of computing device 700 (of FIG. 14). The procedure begins at start point 400 with receiving a request from a user to access a particular web page (stage 402). A lexicon procedure/component is called to retrieve the key words of the lexicon(s) present in the particular web page (and the procedure/component is passed the URI of the particular web page) (stage 404). A collection of key words of the lexicon(s) present in the particular web page and optionally the associated links to the key words are received back in response (stage 406). The system outputs or otherwise displays the particular web page using the collection of key words and/or their associated links in some manner (stage 408). The process ends at end point 410.

Figure 9:
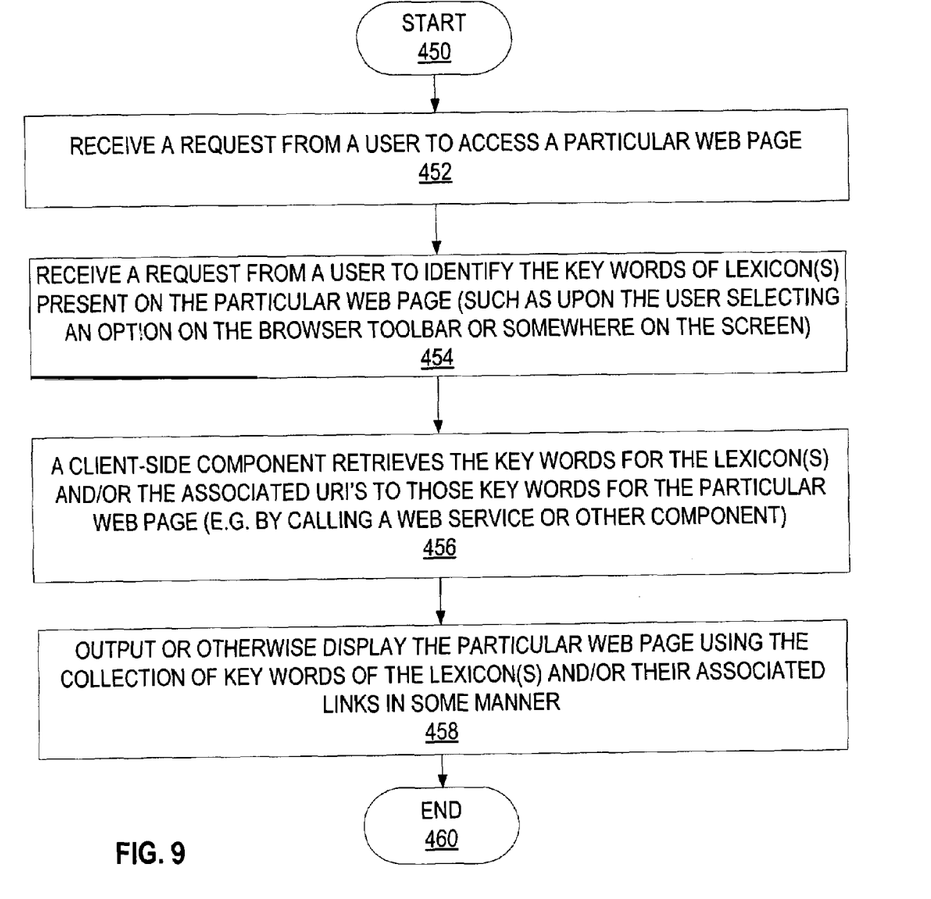
FIG. 9 is a process flow diagram for one implementation of the system of FIG. 1 that illustrates the stages involved in retrieving and using the key words of a lexicon for a particular web page upon request from the user.

FIG. 9 illustrates one implementation of the stages involved in retrieving and using key words of one or more lexicons for a particular web page upon request from the user. In one form, the process of FIG. 9 is at least partially implemented in the operating logic of computing device 700 (of FIG. 14). The procedure begins at start point 450 with receiving a request from a user to access a particular web page (stage 452). A request is received from a user to identify the key words of the lexicon(s) present on the particular web page (such as upon the user selecting an option on the browser toolbar or somewhere on the screen) (stage 454). A client-side component retrieves the key words of the lexicon(s) and/or the associated URI's to those key words for the particular web page (e.g. by calling a web service or other component) (stage 456). The system outputs or otherwise displays the particular web page using the collection of key words of the lexicon and/or their associated links in some manner (stage 458). The process ends at end point 460.

Figure 10:
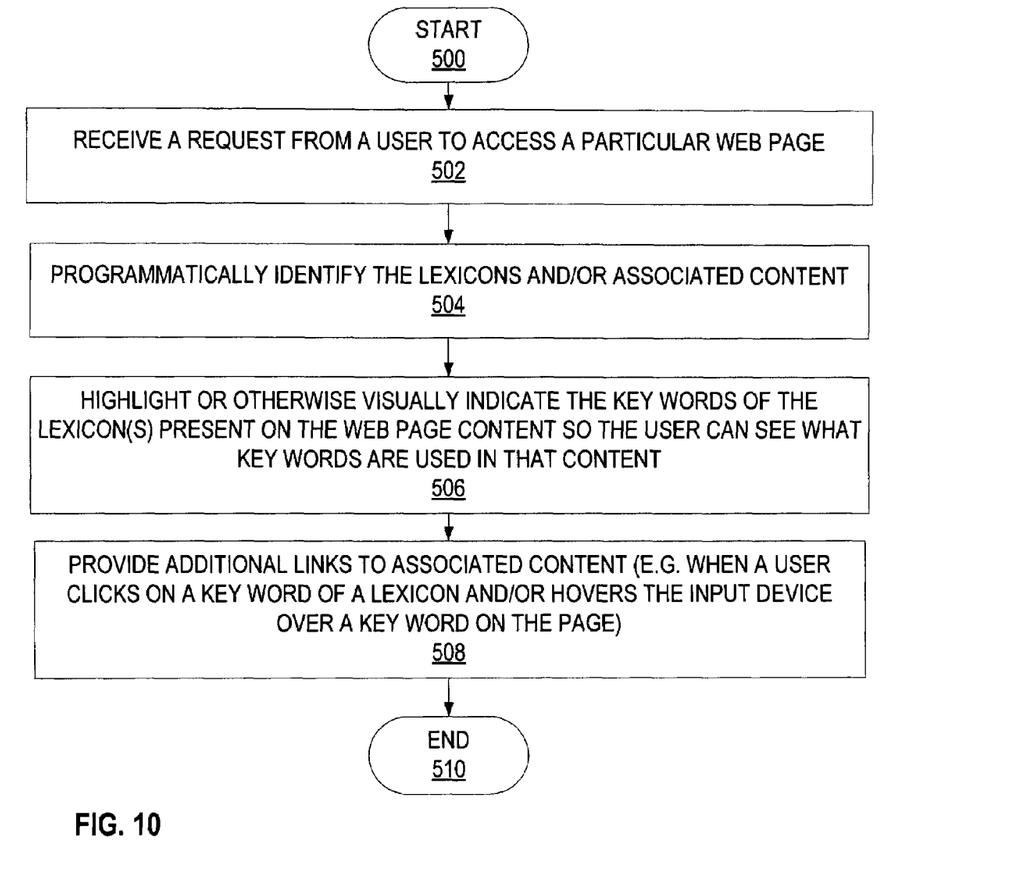
FIG. 10 is a process flow diagram for one implementation of the system of FIG. 1 that illustrates the stages involved in visually displaying the key words of a lexicon present on a particular web page and providing additional links to associated content.

FIG. 10 illustrates one implementation of the stages involved in visually displaying key words of one or more lexicons present on a particular web page and providing additional links to associated content. In one form, the process of FIG. 10 is at least partially implemented in the operating logic of computing device 700 (of FIG. 14). The procedure begins at start point 500 with receiving a request from a user to access a particular web page (stage 502). The lexicons and/or associated content are programmatically identified (stage 504). The system highlights or otherwise visually indicates the key words of the lexicon(s) present on the web page content so the user can see what key words are used in that content (stage 506). Additional links are provided to associated content (e.g. when a user clicks on a key word of a lexicon and/or hovers the input device over a key word of a lexicon on the page) (stage 508). The process ends at end point 510.

Figure 11:
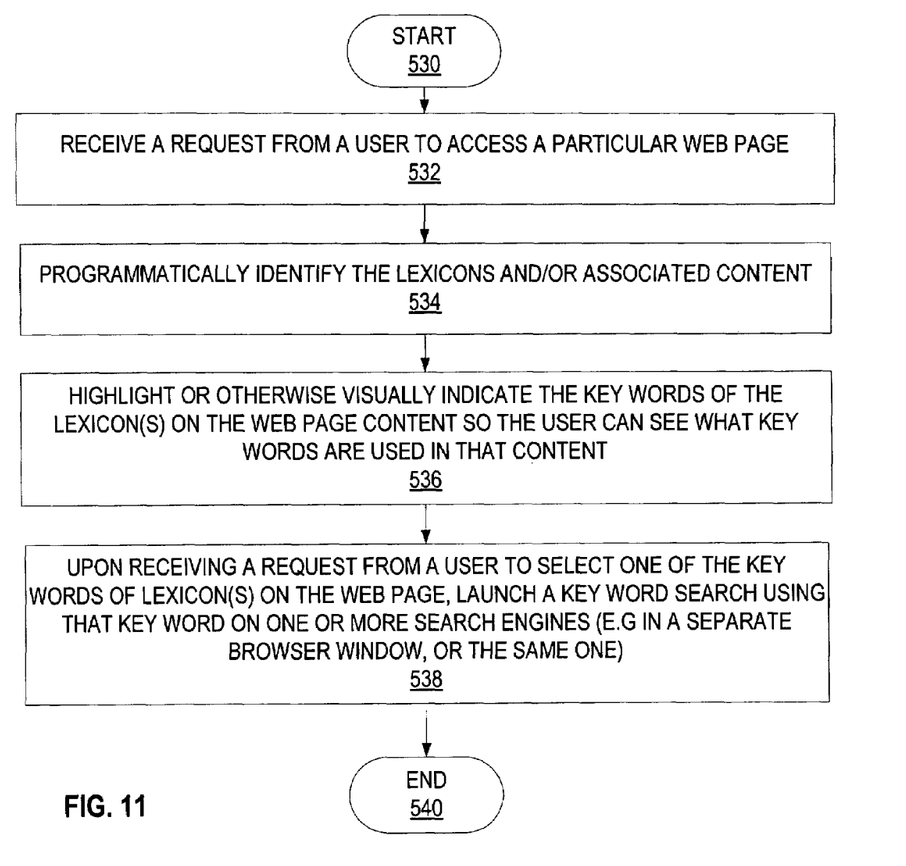
FIG. 11 is a process flow diagram for one implementation of the system of FIG. 1 that illustrates the stages involved in visually displaying the key words of a lexicon on a particular web page and launching a key word search using a selected lexicon.

FIG. 11 illustrates one implementation of the stages involved in visually displaying key words of one or more lexicons on a particular web page and launching a key word search using a selected lexicon. In one form, the process of FIG. 11 is at least partially implemented in the operating logic of computing device 700 (of FIG. 14). The procedure begins at start point 530 with receiving a request from a user to access a particular web page (stage 532). The lexicons and/or associated content are programmatically identified (stage 534). The system highlights or otherwise visually indicates the key words of the lexicon(s) present in the web page content so the user can see what key words are used in that content (stage 536). Upon receiving a request from a user to select one of the key words of a lexicon on the web page, a key word search is launched using the key word on one or more search engines (e.g. in a separate browser window or the same browser window) (stage 538). The search against one or more search engines can contain only the selected key word, and/or other key words in combination. The process ends at end point 540.

Figure 12:
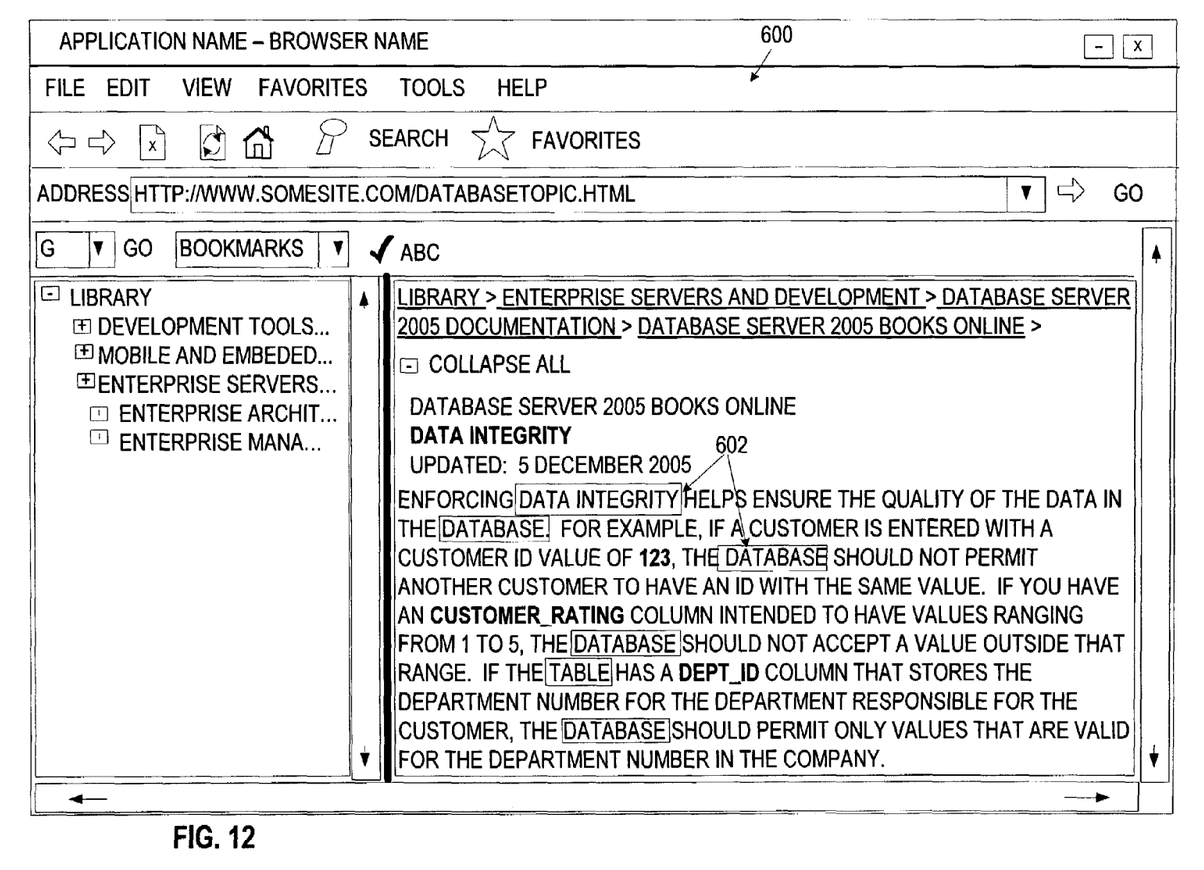
FIG. 12 is a simulated screen for one implementation of the system of FIG. 1 that illustrates visually indicating the key words of a lexicon present on a particular web page by highlighting the terms.
Figure 13:
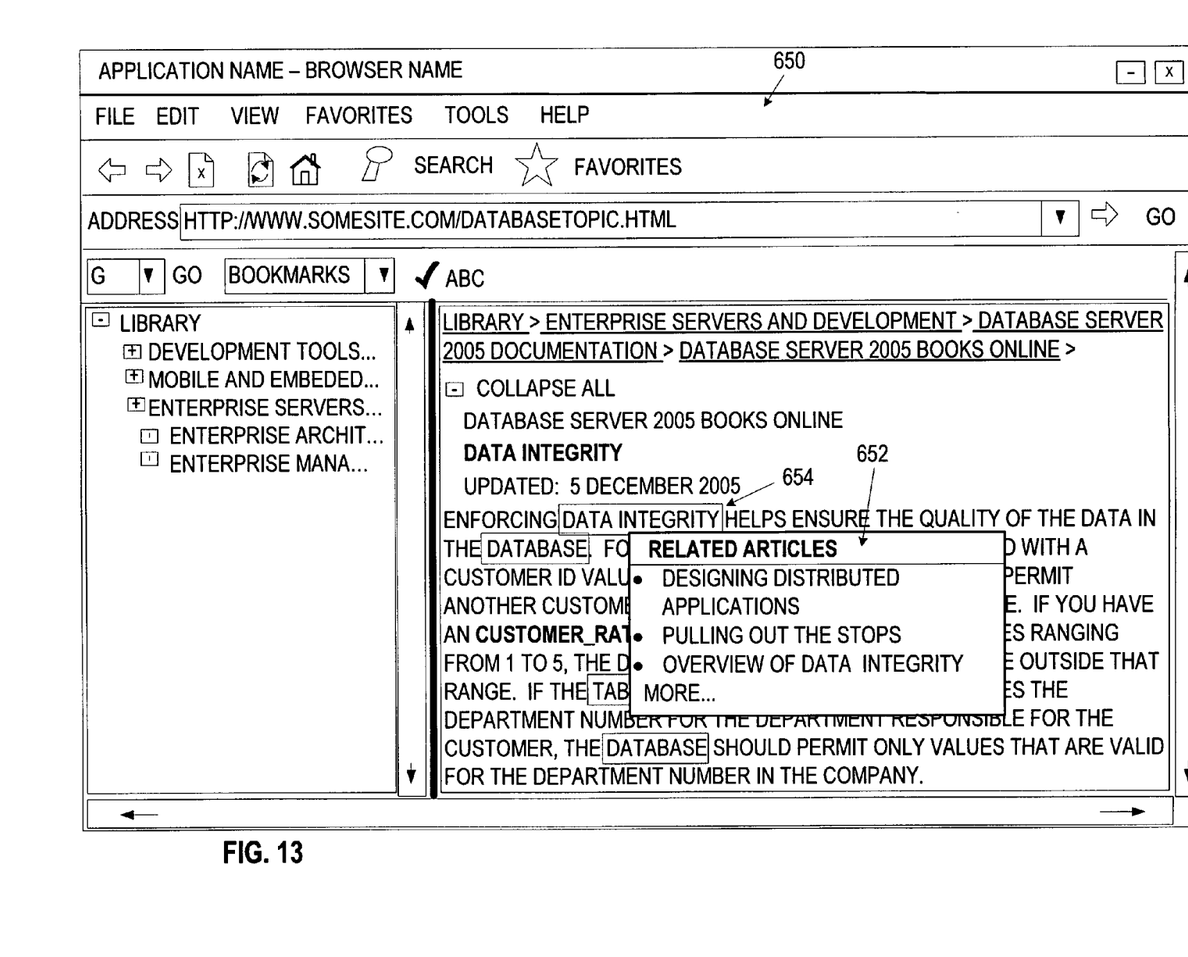
FIG. 13 is a simulated screen for one implementation of the system of FIG. 1 that illustrates allowing a user to access the correlated content for a particular key word of a lexicon to view additional information.

Turning now to FIGS. 12-13, simulated screens are shown to illustrate a user interface that for at least a part of lexicon-based content correlation and navigation application 200. These screens can be displayed to users on output device(s) 111. Furthermore, these screens can receive input from users from input device(s) 112.

Turning now to FIG. 12, a simulated screen 600 is shown to visually indicate the key words of a lexicon that are present on a particular web page by highlighting or otherwise visually marking the terms. The key words of a lexicon that is present in the particular article are shown highlighted 602 (with a box around them in FIG. 12). To preserve clarity, some of the lexicon terms that are highlighted on FIG. 12 are not marked with reference number 602. In one implementation, by visually indicating to the user what key words of the lexicon(s) were contained in the particular content, the user is better able to refine additional searches. As one non-limiting example, the user can then use those terms in additional key word searches. As another non-limiting example, the user can select a particular key word of a lexicon on the screen and have the system perform additional searches and/or show correlated content based on the selected key word.

FIG. 13 shows a simulated screen 650 of one implementation that illustrates allowing a user to access the correlated content for a key word of a particular lexicon to view additional information. In the example shown, the term "data integrity" 654 is a key word of the lexicon that is visually indicated on the screen. When the user moves an input device over the term 654 or otherwise selects the term, a pop-up menu 652 is shown that contains correlated content. This pop-up menu 652 allows the user to select a particular one of the items in the menu 652 to activate a hyperlink and then view the related article. One of ordinary skill in the software art will appreciate that various other techniques for allowing a user to access and/or active the correlated content for a given key word of a lexicon could also be used.

Figure 14:
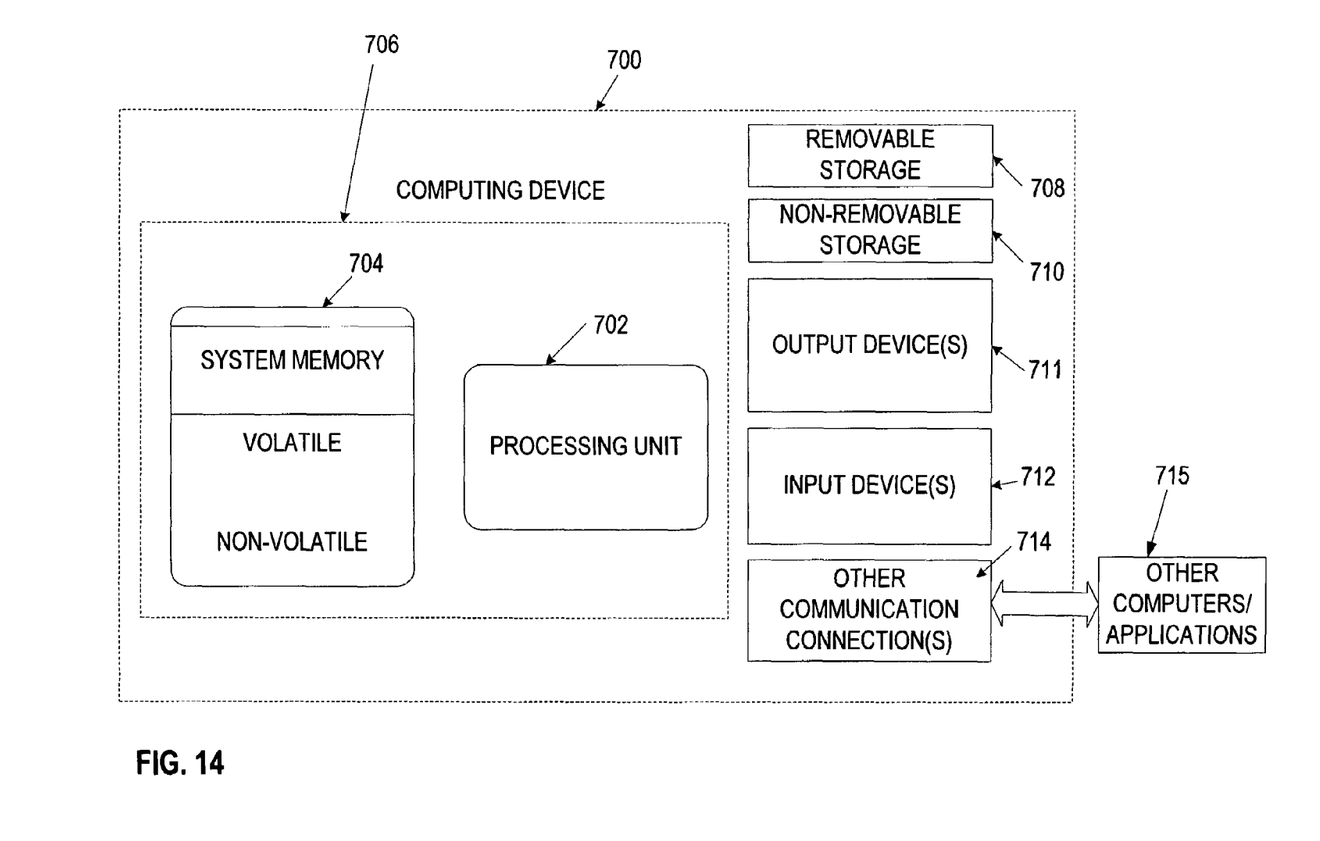
FIG. 14 is a diagrammatic view of a computer system of one implementation.

As shown in FIG. 14, an exemplary computer system to use for implementing one or more parts of the system includes a computing device, such as computing device 700. In its most basic configuration, computing device 700 typically includes at least one processing unit 702 and memory 704. Depending on the exact configuration and type of computing device, memory 704 may be volatile (such as RAM), non-volatile (such as ROM, flash memory, etc.) or some combination of the two. This most basic configuration is illustrated in FIG. 14 by dashed line 706.

Additionally, device 700 may also have additional features/functionality. For example, device 700 may also include additional storage (removable and/or non-removable) including, but not limited to, magnetic or optical disks or tape. Such additional storage is illustrated in FIG. 14 by removable storage 708 and non-removable storage 710. Computer storage media includes volatile and nonvolatile, removable and non-removable media implemented in any method or technology for storage of information such as computer readable instructions, data structures, program modules or other data. Memory 704, removable storage 708 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 700. Any such computer storage media may be part of device 700.

Computing device 700 includes one or more communication connections 714 that allow computing device 700 to communicate with other computers/applications 715. Device 700 may also have input device(s) 712 such as keyboard, mouse, pen, voice input device, touch input device, etc. Output device(s) 711 such as a display, speakers, printer, etc. may also be included. These devices are well known in the art and need not be discussed at length here. In one implementation, computing device 700 includes some or all parts of lexicon-based content correlation and navigation application 200.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organ zed differently on one or more computers to include fewer or additional options or features than as portrayed in the examples.

What is claimed is:

1. A method comprising:
analyzing a plurality of web pages;
identifying, by a computer in response to the analyzing, a plurality of lexicons indicated by the plurality of web pages, wherein keywords of each lexicon of the plurality of lexicons are based on conventional sources including dictionaries, and wherein the keywords of each lexicon include terms related to a subject of the plurality of web pages, and wherein each lexicon represents a different subject;
determining, by the computer in response to the identifying, that at least one lexicon of the plurality of lexicons corresponds to a web page of the plurality of web pages;
storing, in response to the determining, the keywords of the at least one lexicon and an association between the keywords and the corresponding web page;
receiving a request to access the corresponding web page;
retrieving, based on the receiving, the stored keywords of the at least one of the lexicons that correspond to the corresponding web page;
displaying the corresponding web page; and
highlighting, in the displayed web page, words in the displayed web page that match the retrieved keywords.

2. The method of claim 1 wherein the analyzing and the identifying and the determining and the storing are performed prior to the receiving.

3. The method of claim 1 wherein the analyzing and the identifying and the determining and the storing are performed in response to the receiving.

4. The method of claim 1, further comprising:
correlating the plurality of web pages based on the plurality of lexicons; and
creating, based on the correlating, associations between web pages of the plurality of web pages and between the web pages and the plurality of lexicons.

5. The method of claim 4 wherein the highlighting includes enabling access to a web page from the correlated plurality of web pages.

6. At least one computer-readable storage medium excluding signal or carrier wave type of medium, comprising computer-readable instructions that, when executed by a computer, cause the computer to perform a method comprising:
analyzing a plurality of web pages;
identifying, in response to the analyzing, a plurality of lexicons indicated by the plurality of web pages, wherein keywords of each lexicon of the plurality of lexicons are based on conventional sources including dictionaries, and wherein the keywords of each lexicon include terms related to a subject of the plurality of web pages, and wherein each lexicon represents a different subject;
determining, in response to the identifying, that at least one lexicon of the plurality of lexicons corresponds to a web page of the plurality of web pages;
storing, in response to the determining, the keywords of the at least one lexicon in association with the corresponding web page;
receiving a request to access the corresponding web page;
retrieving, based on the receiving, the stored keywords of the at least one of the lexicons that correspond to the corresponding web page;
displaying the corresponding web page;
highlighting, in the displayed web page, words in the displayed web page that match the retrieved keywords.

7. The at least one computer-readable storage medium of claim 6 wherein the analyzing and the identifying and the determining and the storing are performed prior to the receiving.

8. The at least one computer-readable storage medium of claim 6 wherein the analyzing and the identifying and the determining and the storing are performed in response to the receiving.

9. The at least one computer-readable storage medium of claim 6, the method further comprising:
correlating the plurality of web pages based on the plurality of lexicons; and
creating, based on the correlating, associations between web pages of the plurality of web pages and between the web pages and the plurality of lexicons.

10. The at least one computer-readable storage medium of claim 9 wherein the highlighting includes enabling access to a web page from the correlated plurality of web pages.

11. A computing device including a processor and memory, the computing device configured to:
- analyze a plurality of web pages;
- identify a plurality of lexicons indicated by the analyzed plurality of web pages, wherein keywords of each lexicon of the plurality of lexicons are based on conventional sources including dictionaries, and wherein the keywords of each lexicon include terms related to a subject of the plurality of web pages, and wherein each lexicon represents a different subject;
- determine that at least one lexicon of the identified plurality of lexicons corresponds to a web page of the analyzed plurality of web pages;
- store the keywords of the at least one lexicon in association with the corresponding web page;
- receive a request to access the corresponding web page;
- retrieve, based on the request, the stored keywords of the at least one of the lexicons that correspond to the corresponding web page;
- display the corresponding web page; and
- highlight, in the displayed web page, words in the displayed web page that match the retrieved keywords.

12. The computing device of claim 11 wherein the system is further configured to analyze and identify and determine and store prior to the request being received.

13. The computing device of claim 11 wherein the system is further configured to analyze and identify and determine and store in response to the request being received.

14. The computing device of claim 11 further configured to:
- correlate the plurality of web pages based on the plurality of lexicons; and
- create associations between web pages of the correlated plurality of web pages and between the web pages and the plurality of lexicons.

15. The computing device of claim 14 further configured to enable access via a highlighted word to a web page from the correlated plurality of web pages.

* * * * *